United States Patent [19]
Parks et al.

[11] 4,307,655
[45] Dec. 29, 1981

[54] LOW PROFILE VENTILATING HATCH

[76] Inventors: Edgar L. Parks; Greig H. Parks, both of P.O. Box 527, Rte. 235 South of USNAS, Lexington Park, Md. 20653

[21] Appl. No.: 119,161

[22] Filed: Feb. 6, 1980

[51] Int. Cl.³ .............................................. B60H 1/24
[52] U.S. Cl. ....................................... 98/2.14; 98/2.17; 98/37; 114/211
[58] Field of Search ................... 98/2.14, 2.17, 37, 42, 98/62, 64, 2.15, 2.16, 13, 18; 114/334, 211; 9/1.7; 220/373, 374

[56] References Cited
U.S. PATENT DOCUMENTS

| | | | |
|---|---|---|---|
| 2,711,126 | 6/1955 | Atkinson | 98/42 X |
| 3,311,043 | 3/1967 | Atkinson | 98/42 X |
| 3,779,149 | 12/1973 | Bernard, Jr. | 98/2.17 X |

FOREIGN PATENT DOCUMENTS 69438  9/1940  Norway ................................ 98/18

*Primary Examiner*—Albert J. Makay
*Assistant Examiner*—Harold Joyce
*Attorney, Agent, or Firm*—Low and Low

[57] ABSTRACT

A low-profile ventilating hatch for boats, buildings, etc. formed from two nested thermoformed sheets defining therebetween a tortuous air path for below decks ventilation while dust and moisture are trapped and led outwardly through drains. The overall height is remarkably low so as not to impede personnel or equipment, while structurally rigid for rough usage, including walking thereon.

8 Claims, 5 Drawing Figures

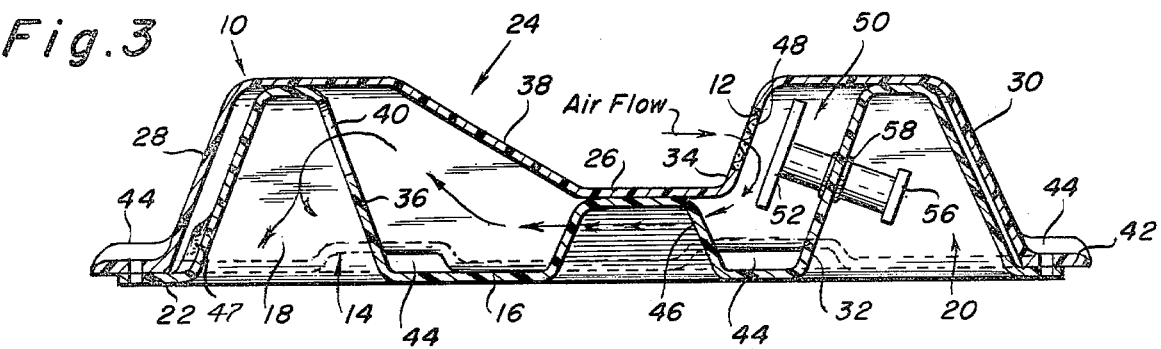
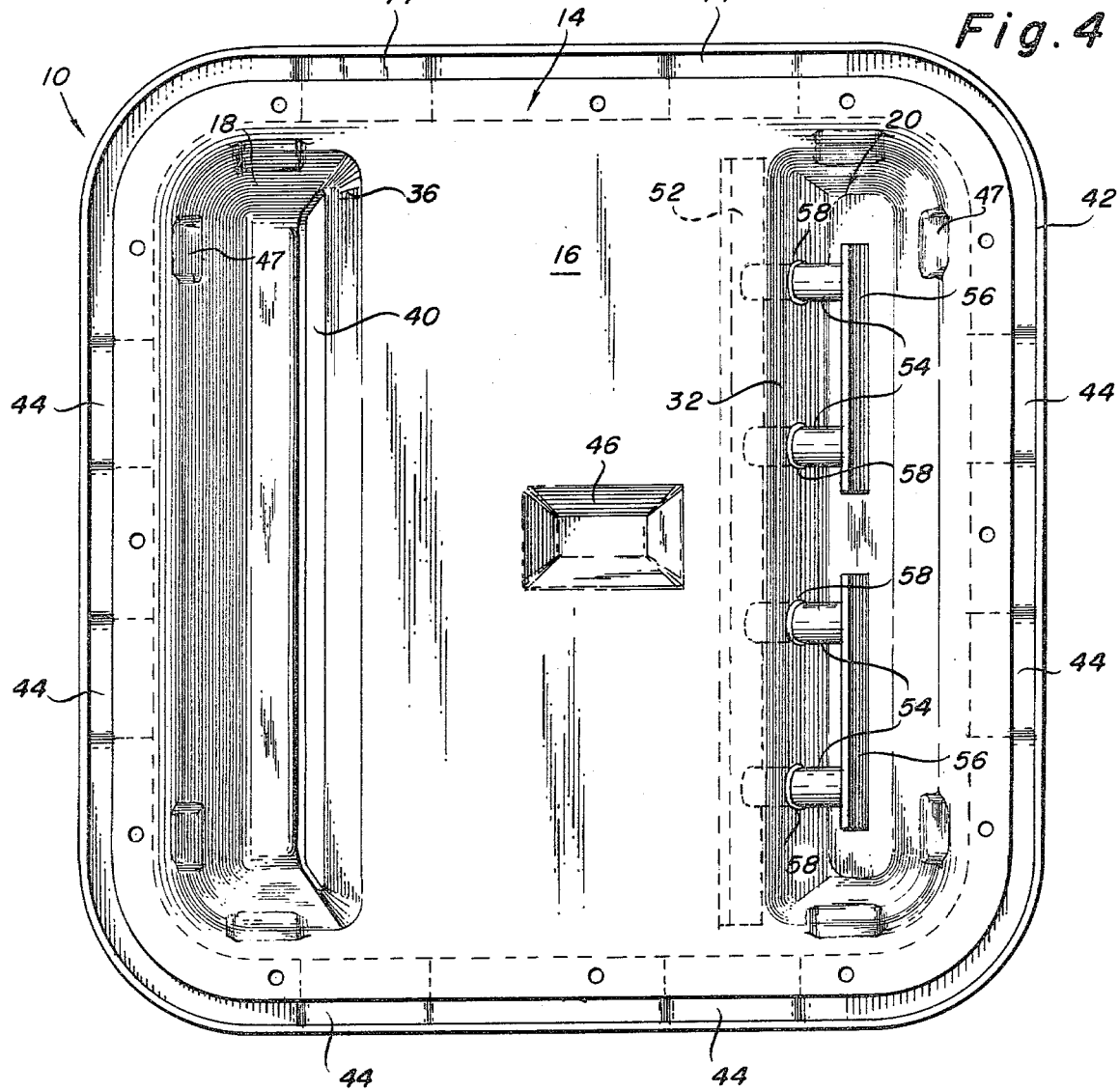
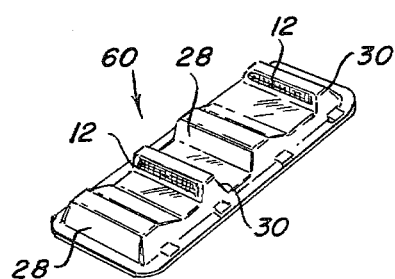

LOW PROFILE VENTILATING HATCH

BACKGROUND OF THE INVENTION

In watercraft, especially those which require on-deck activity such as sailboats, it is necessary to provide minimum deck obstruction or clutter while still providing effective ventilation for cabin space or any below deck area. Hitherto, good ventilation has been obtained by diverse means, such as by means of the well-known Dorade boxes, which comprise vertically upstanding funnel-like members directed forwardly of the boat or ship and into which air is funneled by relative wind and the forward motion of the craft for conduction therethrough to a point below decks.

On ocean liners or relatively larger power craft, the provision of upstanding Dorade boxes or equivalent ventilating means does not present a significant obstruction problem. On smaller craft or those calling for deck activity such as sailboats, relatively unobstructed deck space is at a premium. It is readily evident that untoward obstructions mounted thereon provide a clear hazard to crew or other personnel who of necessity must walk or move over the deck in handling lines or equipment or otherwise attending to proper shipboard techniques. In like manner, unnecessary upstanding projections in the nature of Dorade boxes not only present a hazard to the legs or the feet of crewmen but also provide an unwanted source of entanglement of lines by virtue of the upstanding and funnel-like nature thereof.

BRIEF DESCRIPTION OF THE INVENTION

The present invention uniquely and in a highly simple and effective manner does away with previous problems of providing proper and adequate ventilation below decks in a watercraft, sailboat or indeed any enclosed area requiring roof or ceiling porting for ventilation purposes, whether marine or otherwise as motor vehicles, sheds, buildings, etc.

To this end, the invention contemplates a ventilating hatch construction of very low necessary height, thereby minimizing the hazard to personnel working in proximity thereto as well as further eliminating the danger or hazard of lines or the like becoming fouled or entangled therewith. Further, the ventilating hatch of the present invention while maintaining a remarkably low profile, nonetheless delivers substantial ventilation to the space therebeneath to be freshened by infed air and which at the same time precludes ingress of rain water, spray or other unwanted presence of liquid or dirt directed thereat.

Additionally, and contributing to the highly unique nature of the ventilating hatch of the invention, the same by virtue of its substantially planar character not only does not significantly impede footwork of members of the crew thereabout, but also is of substantial strength so as to withstand or indeed support persons standing or walking thereon in the course of their duties.

The objects of the invention are achieved uniquely by the provision of interfitting of inner and outer shell members wherein the respective member have cooperating protuberances which usually support each other and are slotted so as to receive air therethrough while precluding delivery of liquid or moisture to the air therebeneath to be ventilated.

BRIEF DESCRIPTION OF THE DRAWINGS

FIG. 3 is a sectional side elevation thereof taken on the lines 3—3 in FIG. 1;

FIG. 4 is a bottom plan view of the hatch; and,

FIG. 5 is a perspective view in reduced scale of a modified form of the invention.

DESCRIPTION OF THE PREFERRED EMBODIMENT

Figure 1:
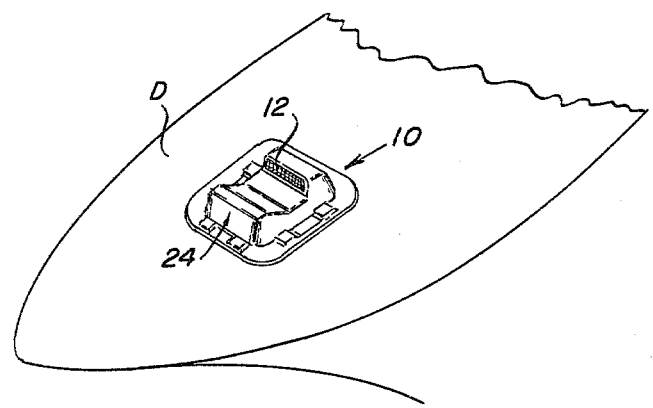
FIG. 1 is a view generally illustrating the bow and foredeck of a boat upon which a hatch in accordance with the invention is shown in relatively exaggerated form.
Figure 2:
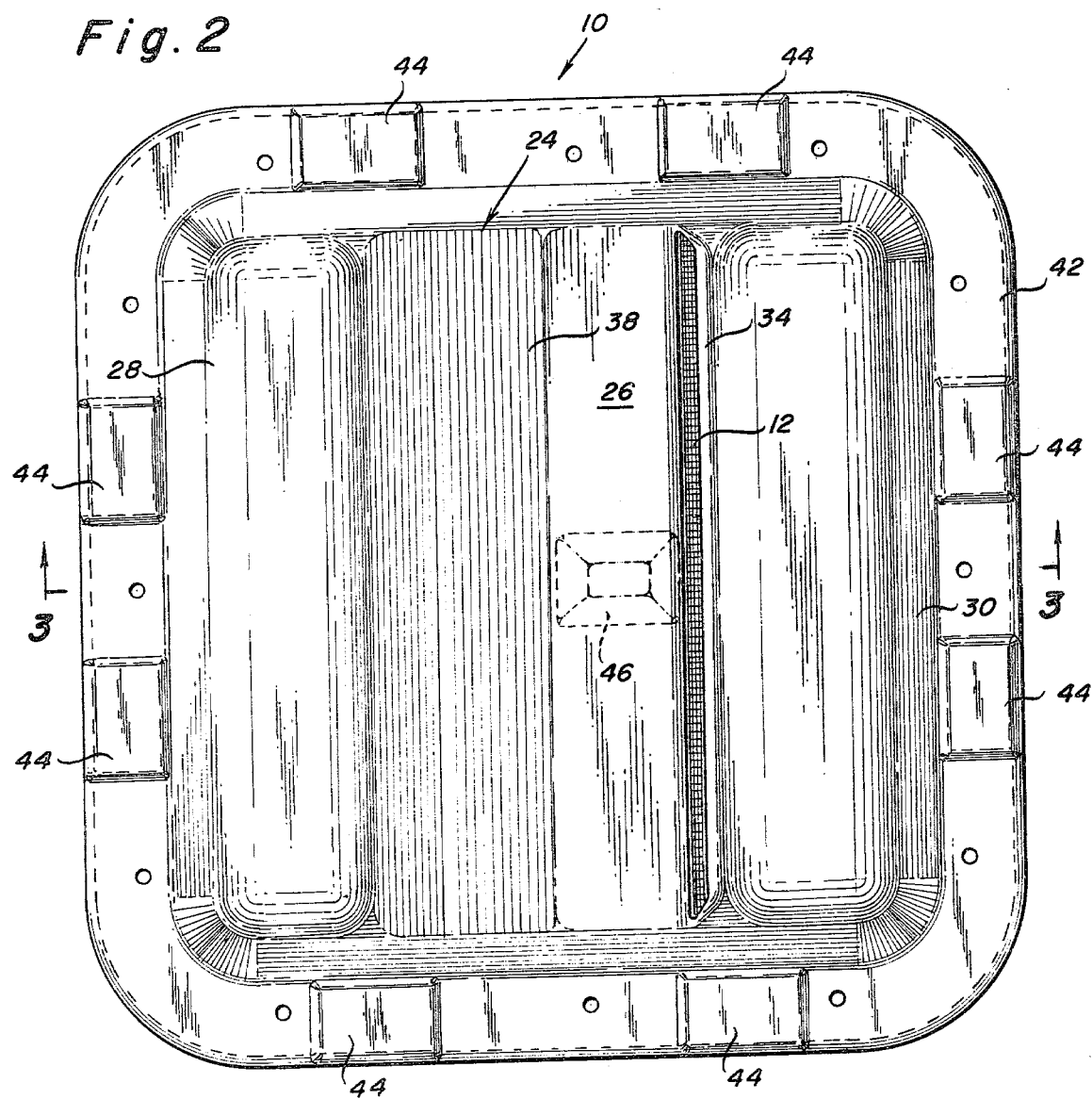
FIG. 2 is a top plan view of the hatch.

With reference to the accompanying drawings, FIG. 1 generally illustrates in somewhat exaggerated relation the provision of a ventilating hatch 10 of the present invention as it might be viewed on the fore portion of the deck D of a sailing craft wherein ventilating air is admitted through a slotted opening 12 in an outer hatch shell portion 24, the air passing therethrough and along a tortuous path for delivery into the space below decks as in a cabin or elsewhere.

With regard to FIG. 3 wherein the unique hatch 10 in its simplest form is seen in cross section, an inner generally rigid shell member 14 includes a substantially planar central area 16 bounded by a forward transverse elongated protuberance 18 and a generally similar protuberance 20 at the rear thereof. The inner shell 14 further preferably includes a peripheral flange therearound as indicated at 22.

Disposed thereof over and cooperating therewith is a generally similar outer shell member 24 which includes a central portion 26 substantially planar in nature and which is visibly of smaller extent that the planar area 16 of the inner shell.

The shells 14, 24 are preferably formed from sheets of heavy gauge plastic as by the thermoforming and have sufficient rigidity and structural strength to bear the weight of personnel who might be expected to step thereon and other rough usage.

It is desirable that the plastic material be transparent or translucent in aiding illumination below the hatch. As set forth more fully hereinafter, the inner shell provides substantial support to and for the outer shell, whereby relatively transparent materials as acrylic and polycarbonate resins may be employed. While plastic is a preferred material due to ease of handling, corrosion resistance and available transparency, other material as sheet metal might be employed if desired.

As with the inner shell, the outer shell includes forward and rear protuberances respectively at 28 and 30. It will be seen that the respective inner and outer members 24, 14 complementarily generally nest one within the other and more particularly, the front wall 32 of inner shell rear protuberance 20 is in spaced relation to the front wall 34 of outer shell rear protuberance 30. In like manner, it will be seen that the rear wall 36 of forward protuberance 18 of inner shell 14 is in spaced relation to the rear wall 38 of the forward protuberance 28 of the outer member 24. Further, the slope of the rear wall 38 in such that the adjacent planar central section 26 is in vertically spaced relation to the planar section or area 16 of the inner shell member.

As above noted, the front wall 34 of the outer shell rear protuberance is transversely slotted or apertured at 12 and it will be seen that the rear wall 36 of the forward protuberance 18 of the inner shell 14 is similarly slotted at 40. Further, the rearwardly-facing slot 40 has its lower edge in vertically spaced relation to the planar central area 16.

The outer member 24 is also peripherally flanged as at 42 so as to sit upon in overlying relation to the like flange 22 on the inner shell. This is with the exception of drain areas 44 about the outer shell flange is elevated with respect to flange 22 so that drainage may occur from within the nested shells and between the flanges at such spaced locales.

As seen in the drawings, the outer member 24 is firmly supported by engagement within the protuberances 28,30 thereof of the inner shell protuberances 18, 20. In order to further reinforce the construction thereby to rigidify the same for encountered rough use or necessary stepping thereupon, the inner member along the inner planar portion 16 is provided with one or more upstanding embossments 46 which vertically span the distance between the planar portion 16 and that of the outer member at 26 so as to engage the latter thereat and support the same. The inner shell may further include small bosses 47 adjacent the flange which extend toward and may contact the inner face of outer shell 24 and aid in properly centering the shells when initially nested.

As with the interfitting engagement of respective elongated protuberances, the embossments 46 may be mechanically or chemically bonded by adhesives to the adjacent surface if desired, along with the interfitting protuberances and overlying flanges to form a unit-handled assembly.

It is desirable that insects as well as pieces of trash and the like be precluded from entering the hatch. To this end a length of screening as at 48 may be secured to the periphery of the outer shell slotted opening 12. It should be noted that air inlet opening 12 is spaced rearwardly of and somewhat protected by forward protuberance 28 against accidental impact.

Further, it may be necessarily desirable that ventilation or air flow be controlled or shut-off through the ventilating hatch of the present invention when undesired or unnecessary. To this end closure means are provided in the nature of a valve assembly 50. In a preferred and effective form thereof, the valve assembly 50 includes an elongated closure plate 52 of an area as great as the slot 12. Plate 52 is supported on a plurality of rods 54 connected to a handle or like member 56 disposed in front wall 32 of the rear protuberance 20 of the inner member 14 and is thus accessible from below. Seal means in the nature of grommets 58 of rubber or the like serve to support and provide frictional restraint for the rods 54 of the valve assembly 50, whereby with the handle 56 from within the cabin or otherwise beneath the hatch assembly, the closure plate 52 may be shifted forwardly to completely block the slot 12 or may be moved rearwardly as desired and frictionally held in the space between the front walls 34, 32 of the rear protuberances of the inner and outer shell members as is evident. In this manner, highly effective and simple control of the ventilating action is achieved.

The ventilating hatch in use is secured about an opening through the deck to space below. In the form shown for simple and permanent installation, the peripheral flanges 22, 42 are provided with screw holes for securing the same. It is within the scope of the invention that the hatch might be mounted for upward pivoting as a unit about one edge for general access through the port or for uncontrolled ventilation. In like manner, the hatch assembly may be associated with spaced parallel channels on opposite sides thereof so that the hatch as a unit may slide in a rectilinear manner to uncover the deck opening when desired. Such pivot hinge and slide mountings per se for hatch covers are well known in the art and form no part of the instant invention.

In use, it will be seen that with the hatch 10 in position upon the deck of a boat, or indeed upon the roof of a building or a vehicle such as a van, camper or the like, ventilating air may pass into the hatch through the slot 12 in the outer shell 24 and thence impinge against the forward wall 32 of the inner protuberance so as to be reversed in flow and directed forwardly between the upper and lower planar portions 16,26 of the shells and thence through slot 40 in the rear wall 36 of the forward protuberance 18, and thence downwardly into the cabin, building, vehicle or the like.

Screen 48 precludes entry of larger trash, while the tortuous airflow path will permit many other dirt and dust particles to fall onto the central planar portion 16 and not be carried into the cabin. Similarly, spray, rain or other moisture passing through the screen will collect on the planar portion 16 of the lower shell, and cannot readily pass upwardly along wall 36 and into air flow slot 40. Any excess moisture or liquid will readily pass laterally outwardly through drains 44 back onto the deck or other comparable surface.

It will be seen that the ventilating hatch thus described is of minimum vertical height and provides the least possible impediment to crewmembers who may work therearound or other personnel that may necessarily work in proximity to such ventilating hatch constructions, while yet providing highly effective ventilation. Further, note that the top portions of outer shell protuberances 28,30 are substantially flat to aid footing thereon.

While in the prefered embodiment the low-profile hatch of the invention is substantially square and has a single air inlet 12, it is within the scope of the invention to provide elongate or larger hatches with two or more air inlets, depending upon the construction and ventilating needs of the vessel. An illustrative modification is shown in FIG. 5 wherein hatch 60 includes a fore-to-aft elongated configuration with two spaced air inlets 12. The construction is essentially two duplicate assemblies conforming to FIG. 3 with each shell formed from a single sheet. Other modifications will be apparent to those skilled in the art.

One actual form of the invention, the respective inner and outer shell members comprise thermoformed sheets of heavy gauge transparent plastic on the order of $\frac{1}{8}$ inch. The hatch is on the order of 13 inches square, with a total height of only about $2\frac{1}{2}$ inches. It will be seen that substantial ventilation is thus achieved comparable or superior to a Dorade box or the like, yet with an exceeding low profile. With the mutual support between the shells at the protuberances embossments and flanges, an exceptionally rigid, durable and rugged construction is provided.

We claim:

1. A low profile ventilating hatch for decks, roofs and the like comprising an inner member having a planar portion and substantially parallel elongated protuberances spaced on either side of the planar portion, said protuberances including respective front and rear walls, the front protuberance rear wall having an aperture therethrough, an outer member including a substantially planar central portion and front and rear protuberances associated therewith on either side of said planar central portion, said inner member being nested with respect to said outer member with said inner member protuberances received within said outer member protuberances, said rear protuberance of said outer member having an elongated slot in the front wall thereof, said front wall of said outer member being disposed and spaced relation to said front wall of the rear protuberance of said inner member, said rear wall of said outer member front protuberance being in spaced relation to said slotted rear wall of said inner member front protuberance, and said planar sections being in vertically spaced relation, whereby air enters said hatch through said slotted front wall on said outer member rear protuberance and thence passes forwardly between said spaced planar central portion and thence upwardly into said slotted rear wall of said inner member front protuberance and downwardly therefrom for ventilation purposes.

2. The ventilating hatch of claim 1 further including embossments formed on said inner member planar section for supportive engagement with said planar section of said outer member thereby to support said outer member on said inner member at said front and rear protuberances and at said embossments for greater rigidity.

3. The ventilating hatch assembly of claim 1 wherein said inner and outer members include superimposed peripheral flanges for seating relation upon a deck or roof or the like.

4. The ventilating hatch of claim 1 further including means to regulate air flow through said slotted openings.

5. The ventilating hatch of claim 4 wherein said air flow regulating means comprises a valve closure for said slotted opening in said front wall of said outer member rear protuberance.

6. The ventilating hatch of claim 1 wherein said outer and inner members respectively comprise additional pairs of spaced front and rear protuberances thereby to provide a plurality of ventilating openings in said hatch.

7. The construction of claim 1 wherein said slotted opening in said rear wall of said inner member front protuberance is disposed above the level of the inner member planar portion, thereby to preclude moisture ingress into said opening.

8. The construction of claim 1 wherein said inner and outer members include peripherally flanged areas including portions thereof in vertically spaced relation thereby to define openings communicating with said planar central portion of said inner member for liquid drainage.

* * * * *